Nov. 13, 1956  J. H. GATES  2,770,310
POWER PROPELLED HAND TRUCK
Filed Feb. 19, 1953  2 Sheets-Sheet 1
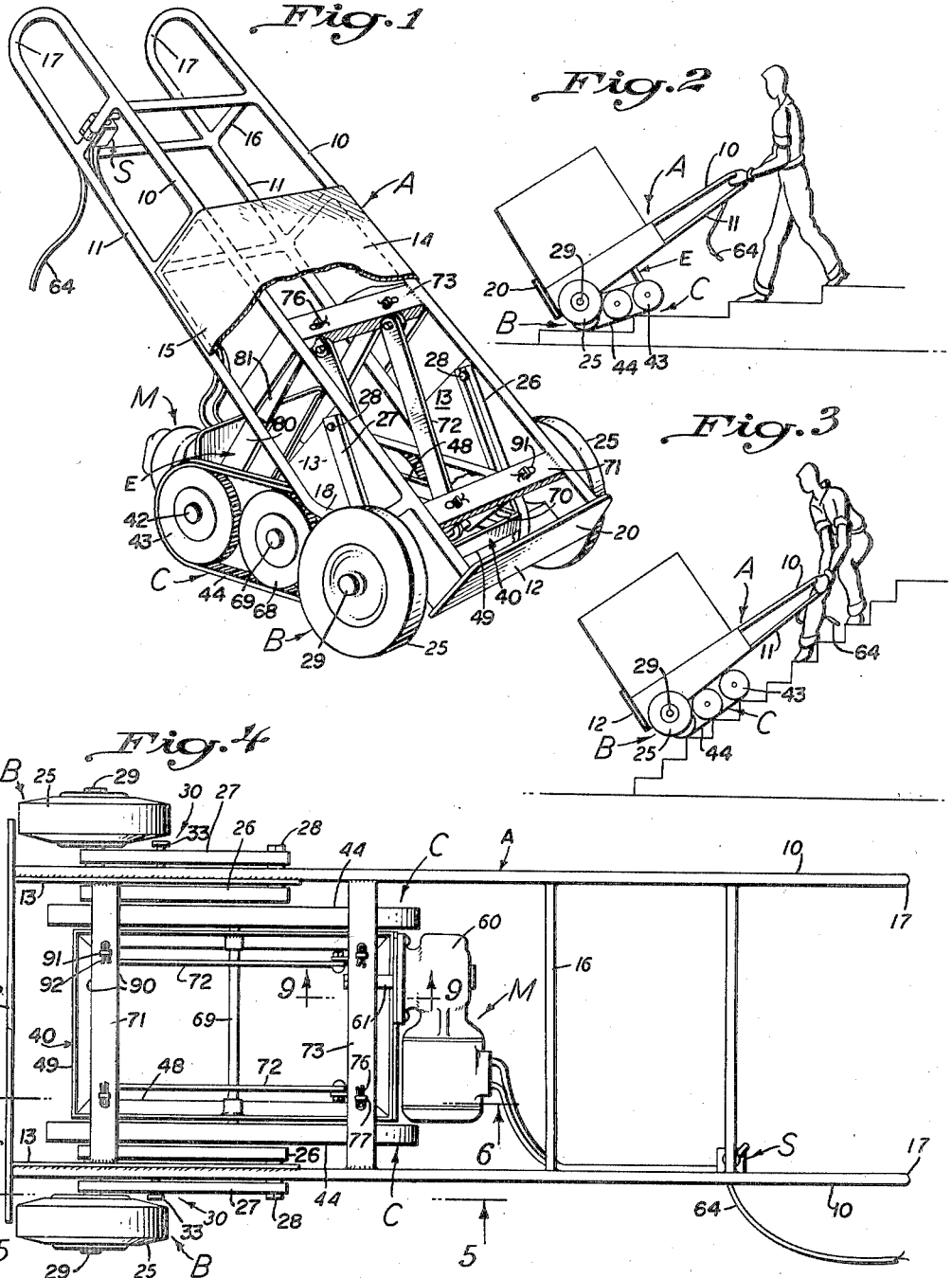
INVENTOR.
JOSEPH HAROLD GATES
BY
Attorney.

Nov. 13, 1956   J. H. GATES   2,770,310
POWER PROPELLED HAND TRUCK
Filed Feb. 19, 1953   2 Sheets-Sheet 2
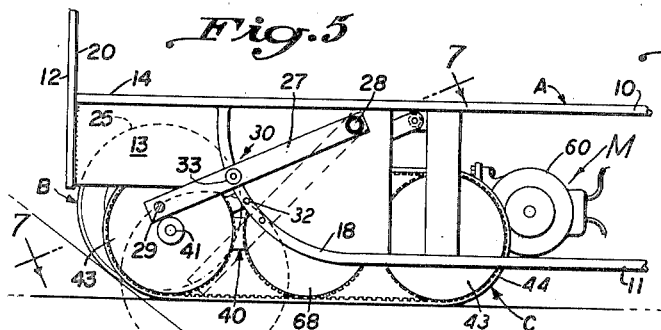
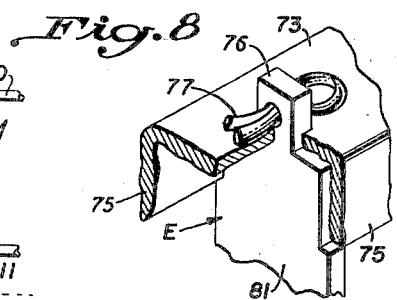
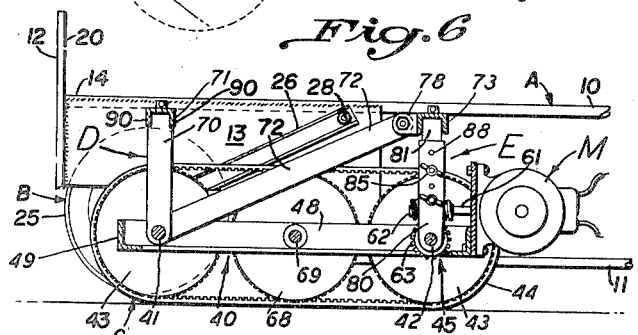
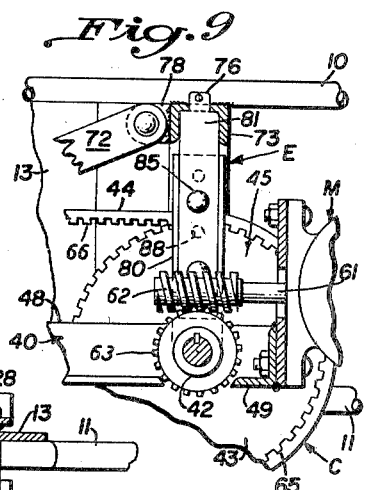
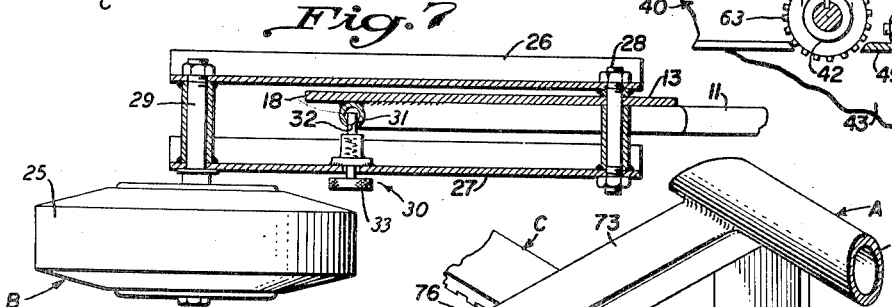
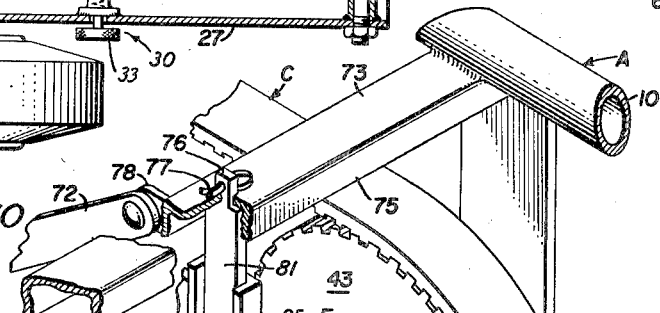
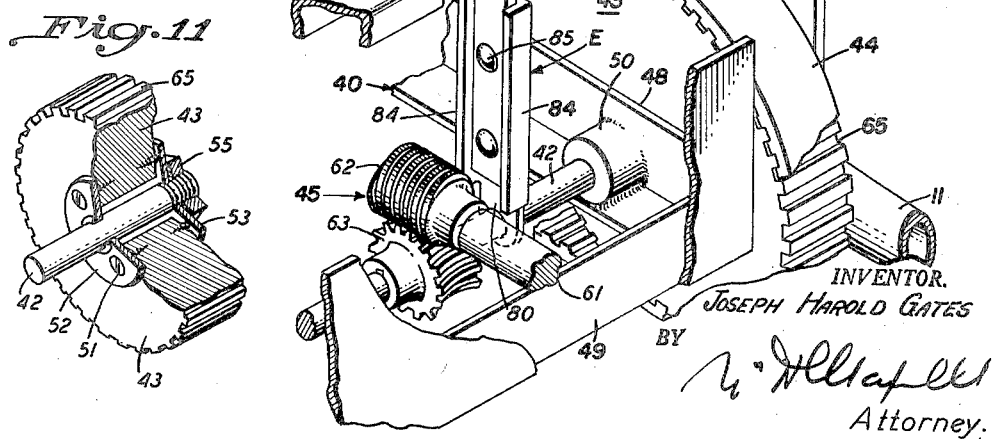
INVENTOR.
JOSEPH HAROLD GATES
BY
Attorney.

_United States Patent Office_

2,770,310
Patented Nov. 13, 1956

2,770,310

POWER PROPELLED HAND TRUCK

Joseph Harold Gates, Glendale, Calif., assignor of one-half to Dale Gates, Milroy, Ind.

Application February 19, 1953, Serial No. 337,726

3 Claims. (Cl. 180—19)

The present invention relates to a cargo carrier, and it is a general object of the invention to provide a simple, practical, improved carrier adapted for use in handling or moving cargo or loads of various kinds, whether over flat surfaces or up or down stairs or like obstacles.

Simple wheel supported cargo handling devices have long been used, and structures for such devices have been proposed or provided to facilitate movement up or down stairs, or the like. Structures of the character referred to are, for the most part, such as to require considerable skill and care in their operation, and if they are to be moved upstairs or over inclining surfaces or obstacles, considerable manual effort is required.

It is an object of this invention to provide a simple, practical, effective cargo carrier which is such that it can be readily operated or rolled over an ordinary floor, or like surface, in the course of the ordinary handling of a load, and which is such that it can, without stopping or variation of construction, be power-operated either up or down stairs or over obstacles, as circumstances may require.

It is another object of this invention to provide a cargo carrier of the general character referred to, wherein two supporting means are related and are adapted to be selectively employed, one of these being a power-driven means.

Another object of the invention is to provide a cargo carrier of the general character referred to, wherein there is a wheel type support and a tractor or belt type support, which supports are related so that they can be readily engaged or selected for operation as circumstances may require.

Another object of the invention is to provide a cargo carrier of the general character referred to, wherein the tractor type support is power-driven and is adapted for use in operating the carrier relative to stairs or like obstacles.

It is another object of this invention to provide a carrier of the general character referred to, having a simple, practical, sturdy construction, and wherein there are but few, simple, dependable parts.

The carrier as provided by the present invention includes, generally, an elongate frame which is a rigid unit, at the forward end portion of which frame there are two supporting means, one a wheel type support and the other a tractor type support. The wheel type support is preferably formed by a pair of wheels coupled to or mounted on the frame to be shiftable between an up or retracted position and a down or working position. The tractor type support preferably includes one or more belts carried by rollers spaced apart longitudinally of the carrier and related to a pivoted carriage. The carriage is pivoted to the frame at the forward end portion thereof, so that it is movable between a working position where it projects down and rearwardly from the forward end portion of the frame, and an up or retracted position where it is substantially parallel with the frame. In practice, the setting of the carriage is determined by the degree or angle of stairs to be traveled.

The various objects and features of my invention will be fully understood from the following detailed description of a typical preferred form and application of my invention, throughout which description reference is made to the accompanying drawings, in which:

Fig. 1 is a perspective view of the carrier provided by the present invention, with portions thereof broken away to illustrate details of construction; Fig. 2 is a somewhat diagrammatic view illustrating the carrier in the course of use; Fig. 3 is a view similar to Fig. 2 illustrating use of the carrier; Fig. 4 is a plan view of the carrier showing it with the platform and side plates removed to show the arrangement and relationship of the other parts; Fig. 5 is a view of a portion of the structure shown in Fig. 4, being a view taken substantially as indicated by line 5—5 on Fig. 4; Fig. 6 is a view of a portion of the structure shown in Fig. 4, being a view taken as indicated by line 6—6 on Fig. 4; Fig. 7 is a sectional view taken as indicated by line 7—7 on Fig. 5; Fig. 8 is a perspective view illustrating a portion of the structure with parts broken away to illustrate details of construction and showing a portion of the coupling means that serves to position the tractor type support relative to the frame of the carrier; Fig. 9 is an enlarged detailed view of a portion of the structure taken substantially as indicated by line 9—9 on Fig. 4; Fig. 10 is a perspective view of a portion of the structure with parts broken away to illustrate details of construction, being a view illustrating parts such as are shown in Fig. 9; and Fig. 11 is a perspective view with a portion broken away illustrating one of the rollers of the tractor type support and showing it mounted on its shaft.

The carrier as provided by the present invention includes, generally, a frame A which is an elongate rigid unit. A wheel type support B is provided at the forward end portion of the frame and includes a pair of like wheels connected to the frame by pivoted arms so that they can be shifted relative to the frame. The support B further includes a means selectively setting the arms against movement relative to the frame.

The structure is characterized by a tractor type support C connected to the frame A by a mounting means D to be shiftable to various positions relative to the frame. The support C is a power-driven unit or mechanism, and a coupling means E is provided to selectively connect the support C and frame A with the support in various positions relative to the frame.

The frame A may, in practice, vary widely in form and construction, and it is essentially an elongate rigid unit. The particular frame A illustrated in the drawings is a fabricated structure and includes, generally, top side rails 10, bottom side rails 11, an end plate 12 at the forward end of the frame, web plates 13 related to the rails at the forward end portion of the frame, a top platform 14 carried by the top rails, side plates 15 depending from the platform at the sides of the frame, and various other parts incidental to those mentioned, such, for instance, as braces 16, etc.

The top side rails 10 may, in practice, be simple, straight, tubular members, and in the case illustrated, they extend continuously from one end of the frame to the other, and they are parallel with each other. The bottom side rails 11 are preferably straight tubular members, located at the sides of the frame, and they are spaced below the top rails 10. In the case illustrated, the rear end portions of the top and bottom rails 10 and 11, respectively, are connected by arcuate end portions 17 which form handles. The bottom rails 11 terminate short of the front end of the frame and their forward ends are connected with top rails 10 by arcuate frame portions 18.

The front end plate 12, may, in practice, be a simple, flat plate suitably fixed to the forward ends of the rails 10 and to the web plates 13, so that it has an upper edge portion in the form of a work-retaining lip 20.

The web plates 13 are shown as simple, vertically disposed plates confined to the forward end portion of the frame where they are secured to the forward portions of the rails 10, to the forward portions of the rails 11, to the arcuate frame parts 18, and to the end plate 12. The web plates 13 are effective in stiffening and strengthening the forward end portion of the frame and, in the case illustrated, they carry the wheel support B, as will be hereinafter described.

In the particular case illustrated, a plurality of braces 16 extend transversely of the frame between the rails of the sides thereof, whereas other braces 16 extend between the rails 10 and 11, with the result that the general frame construction hereinabove described is established as a fixed rigid unit.

The wheel support B is characterized by two like wheels 25, and, in the preferred construction, these are located at the forward end portion of the frame A and adjacent the outer sides of the frame, as clearly illustrated in Figs. 1 and 4 of the drawings. In accordance with the present invention, the wheels 25 are mounted on or coupled to the frame A to be shiftable relative to the forward end portion of the frame between a down position such as is shown in dotted lines in Fig. 5, and in an up or retracted position such as is shown in full lines in that figure, in Fig. 6 and in Figs. 2 and 3. In the particular case illustrated, wheels 25 have individual mountings and each of these wheel mountings includes one or more arms carrying the wheel and connected to the frame A. In the particular case illustrated, each wheel 25 is mounted by means of an inner arm 26 and an outer arm 27. The arms 26 and 27 are of corresponding length and occur at the inner and outer sides of a web plate 13. The upper or rear end portions of the arms 26 and 27 are pivotally connected to the web plate occurring between the arms as by means of a pivot member 28. A wheel-carrying spindle 29 is carried by and extends between the arms 26 and 27 and has a projecting portion on which the wheel is mounted.

In providing the construction just described, the pivot member 28 is located at the upper rear corner portion of the supporting web plate 13, the axis of the pivot member 28 being concentric with the curved frame portion 18 as clearly illustrated in Figs. 1 and 5 of the drawings.

A means 30 is provided to releasably set or secure the pivoted arms 26 and 27 against movement relative to the frame. In the case illustrated, the means 30 includes a spring-pressed lock pin 31 carried by one of the arms and normally engaged in an opening 32 provided in a part of the frame, preferably the arcuate frame part 18. In the particular case shown, the lock pin 31 is carried by the outer arm 27 and is provided at the exterior of arm 27 with an operating nob 33. A series of openings 32 is provided in the curved or arcuate frame part 18, and the lock pin 31 can be selectively engaged in the openings 32 to set the arms in various positions about the axis of the pivot member 28, as will be apparent from a consideration of Fig. 5 of the drawings.

The tractor type support C is connected with the forward portion of frame A by the mounting means D and is a power-driven mechanism serving as a means by which the frame is supported and is subject to being propelled. In the preferred form of the invention, the tractor type support C includes generally an elongate carriage 40, front and rear shafts 41 and 42 respectively, supported by the carriage and extending transversely of the carrier, rollers 43 on the shafts, flexible treads or belts 44 on the rollers, a prime mover or motor M, and a drive 45 from the prime mover M to one of the shafts, preferably the rear shaft 42.

In the preferred form of the invention, the carriage 40 is a rigid rectangular, frame-like unit including elongate side members or beams 48 and end beams 49 extending transversely of the carrier and between the ends of the beams 48.

The front or forward shaft 41 extends between the beams 48 immediately rearward of the forward end beam 49 and is carried in bearings 50 carried by the beams 48. The ends of shaft 41 project from the sides of the carriage, and support or carry rollers 43.

The back or rear shaft 42 extends between the beams 48 immediately forward of the rear end beam 49, and is carried in bearings 50 provided on the beams 48. The ends of shaft 42 project from the sides of the carriage 40, having rollers 43 fixed on them. In the particular case illustrated (see Fig. 11), the rollers 43 fixed on shaft 42 are secured by fasteners 51 to a flange 52 fixed on the shaft. In addition to the structure just described, a retainer in the form of a plate 53 is carried on the terminal end of the shaft to abut the rollers 43, and is held on the shaft by a threaded nut 55 (Fig. 11). It is to be understood that in practice, any suitable means may be provided for fastening or fixing the rollers 43 on the end portions of shaft 42.

The motor or prime mover M is preferably carried by the rearmost end beam 49 of carriage 40, and the drive 45 from motor M to shaft 42 is shown as including a speed reducing mechanism 60 directly coupled with and driven by the motor M, and a drive shaft 61 from the speed reducing mechanism 60, which shaft carries and drives a worm gear 62 that meshes with and drives a worm wheel 63 fixed on the shaft 42. In the drawings, the speed reducing mechanism is shown in a housing attached to the motor, and it is to be understood that, in practice, any suitable form or type of speed reducing mechanism may be provided as desired.

Through the drive 45 just described, there is an effective power drive from the motor M to the shaft 42, which drive in effect locks the shaft 42 against rotation when the motor is not energized. By providing a speed reducing mechanism 60 and a worm gear drive, a very substantial speed reduction can be gained between the motor and the shaft 42, making possible the use of a small, light, high-speed motor to gain a desirable, forceful drive of the shaft 42.

The flexible treads or belts 44 are shown as endless belts carried on the rollers 43 carried between shafts 41 and 42. In the case illustrated, the peripheries or faces of the rollers 43 are provided with teeth 65 and the inner sides or faces of the belts are provided with teeth 66 that mesh with the teeth 65, thus providing a positive drive from the rollers 43 on shaft 42 and the belts 44. In the preferred construction, the shafts 41 and 42 are spaced a substantial distance apart, in which case belt-supporting rollers 68 are provided between the rollers carried between shafts 41 and 42 to afford support to the belt portions that extend between the rollers 43. The supporting rollers 68 are shown carried on a shaft 69 extending between and supported by the beams 48.

The mounting means D serves to pivotally connect a forward end portion of the structure just described with the forward end portion of frame A. In the particular case illustrated, the mounting means D includes supporting members fixed to and depending from the frame, which members are coupled to the tractor type support through the forward shaft 41.

In the case illustrated, legs 70 are fixed to and depend from a transverse spreader 71 which extends between the top side rails 10 and braces 72 extend from the lower end portions of the legs 70 upward and rearward and connect to a spreader 73 that is fixed to and which extends between the upper side rails 10 rearward of spreader 71. The upper ends of the legs 70 are held between depending flanges 75 of spreader 71 (Fig. 8) and tongues 76 project from the legs through openings in spreader 71 and are held by keys 77. The rear ends of the braces 72 connect to brackets 78 projecting from the spreader 73. In the particular case illustrated, the lower ends of the legs and the lower forward ends of the braces 72 have registering openings that pass the forward shaft 41, thereby connecting the tractor type support and the frame A as clearly shown in Fig. 6 of the drawings.

The coupling means E is provided to selectively position the carriage 40 of the support C relative to frame A. Through the mounting means D the carriage 40 can be positioned at various angles relative to frame A, for instance, it can be operated between a position parallel with frame A as shown in Fig. 3, or a position where it extends downward and rearward from the forward portion of frame A as shown in Fig. 2. In the form of the invention illustrated, the coupling means E includes like units connecting the rear end portion of the tractor type support and the frame A. Each unit of means E is shown as including a lower link 80 carried on shaft 42 and projecting upwardly therefrom, and an upper link 81 carried by the spreader 73 and depending therefrom. The links 80 and 81 overlap, and are guided parallel with each other as by flanges 84 on link 80 between which the link 81 is slidably engaged. Releasable fasteners 85 connect the links 80 and 81 against relative movement lengthwise, and a suitable multiplicity of openings 88 in the links to accommodate the fasteners 85 make possible connection of the links in various positions lengthwise relative to each other, whereby the spacing of shaft 42 relative to the spreader 73 can be varied as desired. In the particular case illustrated, the lower link 80 has an opening at its lower end passing the shaft while the upper link 81 fits between flanges 90 of spreader 73 and has a tongue 91 projecting up through the spreader to be held by a key 92.

From the foregoing description it will be apparent that the carrier as provided by the present invention can be operated in much the manner of an ordinary hand truck by setting the wheel support B in a down position relative to the forward end portion of the frame A, in which case it is preferred that the tractor type support be arranged and set in an up position where it is substantially parallel with frame A. When the carrier is to be operated over obstacles or over steps or the like, the wheel type support B can be set in an up position as shown in Figs. 2 and 3, or it may even be fully retracted as indicated in full lines in Fig. 5. With the wheel support B thus set, the tractor type support can be lowered to a position where it extends down and rearward or it can be operated while parallel with frame A. With the wheel type support B and the tractor type support C suitably related, energization of the motor M will result in operation of the treads 44 and consequent propulsion of the carriage, making it unnecessary for the operator to do more than stabilize the structure and guide it as desired. It is to be understood that in practice, a suitable power line in the form of a flexible cord 64 can be extended to the carriage, and the circuit to the motor M may be through a switch S, located convenient to one of the handles 17.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A carrier including, an elongate frame, and two individually shiftable supporting means connected to the forward end portion of the frame and shiftable relative to each other and each shiftable relative to the frame to be selectively and individually employed to support the frame, one of said supporting means being an elongate tractor type supporting means including, an elongate carriage, legs fixed to and depending from the forward end portion of the frame, the forward end portion of the carriage being pivotally carried by said legs on a horizontal axis extending transversely of the frame, adjustably extensible links connecting the frame to the rear end portion of the carriage, there being fasteners for selectively locking the links to secure the rear end portion of the carriage against movement vertically relative to the frame, rollers journaled in each end of the carriage, endless flexible ground engaging members carried by the rollers and extending lengthwise of the carriage, the other said supporting means being a wheel type supporting means including, a pair of spaced arms, and a pair of ground engaging wheels journaled in the forward ends of the arms, the rear ends of the arms being pivotally carried by the frame on an axis extending transversely thereof, the wheels being carried on a common axis to shift with the forward ends of the arms to move vertically relative to the frame and relative to the tractor type support at the forward end of the frame and into and out of position where they are below the tractor type of support at the forward end of the frame, and a pin engageable between each arm and the frame for selectively securing the arms and wheels against movement vertically relative to the frame.

2. A carrier including, an elongate frame, and two individually shiftable supporting means connected to the forward end portion of the frame and shiftable relative to each other and each shiftable relative to the frame to be selectively and individually employed to support the frame, one of said supporting means being an elongate tractor type supporting means including, an elongate carriage, legs fixed to and depending from the forward end portion of the frame, the forward end portion of the carriage being pivotally carried by said legs on a horizontal axis extending transversely of the frame, adjustably extensible links connecting the frame to the rear end portion of the carriage, there being fasteners for selectively locking the links to secure the rear end portion of the carriage against movement vertically relative to the frame, rollers journaled in each end of the carriage, endless flexible ground engaging members carried by the rollers and extending lengthwise of the carriage, a prime mover carried by the carriage, and a worm gear drive connected to the prime mover and to the rollers at one end of the carriage, the other said supporting means being a wheel type supporting means including, a pair of spaced arms, and a pair of ground engaging wheels, journaled in the forward ends of the arms, the rear ends of the arms being pivotally carried by the frame on an axis extending transversely thereof, the wheels being carried on a common axis to shift with the forward ends of the arms to move vertically relative to the frame and relative to the tractor type support at the forward end of the frame and into and out of position where they are below the tractor type of support at the forward end of the frame, and a pin engageable between each arm and the frame for selectively securing the arms and wheels against movement vertically relative to the frame.

3. A carrier including, an elongate frame, and two individually shiftable supporting means connected to the forward end portion of the frame and shiftable relative to each other and each shiftable relative to the frame to be selectively and individually employed to support the frame, one of said supporting means being an elongate tractor type supporting means including, an elongate carriage, legs fixed to and depending from the forward end portion of the frame, the forward end portion of the carriage being pivotally carried by said legs on a horizontal axis extending transversely of the frame, adjustably extensible links connecting the frame to the rear end portion of the carriage, there being fasteners for selectively locking the links to secure the rear end portion of the carriage against movement vertically relative to the frame, rollers journaled in each end of the carriage, endless flexible ground engaging members carried by the rollers and extending lengthwise of the carriage, a prime mover carried by the carriage, a shaft carried by the carriage at one end thereof and carrying the rollers at that end of the carriage, and a worm gear drive from the prime mover to the shaft, the other said supporting means being a wheel type supporting means including a pair of spaced arms, and a pair of ground engaging wheels journaled in the forward ends of the arms, the rear ends of the arms being pivotally carried by the frame on an axis extending transversely thereof, the wheels being carried on a common axis to shift with the forward end of the arms to move vertically relative to the frame and relative to the tractor type support at the forward end of the frame and into and out of position where they are below the tractor type of support at the forward end of the frame, and a pin engageable between each arm and the frame for selectively securing the wheels against movement vertically relative to the frame.

References Cited in the file of this patent

UNITED STATES PATENTS

| | | |
|---|---|---|
| 1,221,739 | Jacobs | Apr. 3, 1917 |
| 1,296,309 | Netzel | Mar. 4, 1919 |
| 1,376,648 | Schneider | May 3, 1921 |
| 2,301,341 | Stevens et al. | Nov. 10, 1942 |
| 2,319,008 | McCormack | May 11, 1948 |
| 2,607,606 | Millen | Aug. 19, 1952 |
| 2,620,041 | Chenette et al. | Dec. 2, 1952 |
| 2,641,325 | Hoffman et al. | June 9, 1953 |

FOREIGN PATENTS

| | | |
|---|---|---|
| 498,643 | Belgium | Feb. 1, 1951 |

(Corresponding to Great Britain, No. 693,983, July 8, 1953)

| | | |
|---|---|---|
| 512,279 | Belgium | Dec. 20, 1952 |
| 15,515 | France | July 25, 1912 |

(1st addition to No. 426,640)

| | | |
|---|---|---|
| 610,344 | Germany | Mar. 8, 1935 |
| 808,411 | Germany | July 16, 1951 |
| 820,089 | Germany | Nov. 8, 1951 |